(12) United States Patent
Taillibert et al.

(10) Patent No.: US 11,499,311 B1
(45) Date of Patent: Nov. 15, 2022

(54) REMOVABLE ROOF DEVICE (71) Applicant: Sophie Taillibert, Dubai (AE)

(72) Inventors: Roger Taillibert, Dubai (AE); Robert Debono, Aix-en-Provence (FR)

(73) Assignee: Sophie Taillibert, Dubai (AE)

( * ) Notice: Subject to any disclaimer, the term of this patent is extended or adjusted under 35 U.S.C. 154(b) by 89 days.

(21) Appl. No.: 17/237,512

(22) Filed: Apr. 22, 2021

(51) Int. Cl.
*E04B 7/16* (2006.01)
*E04B 7/14* (2006.01)
*E04B 1/343* (2006.01)
*B66D 1/74* (2006.01)
*F16H 19/04* (2006.01)
*E04H 3/14* (2006.01)
*E04H 3/22* (2006.01)

(52) U.S. Cl.
CPC ............ *E04B 7/166* (2013.01); *B66D 1/7489* (2013.01); *E04B 1/34357* (2013.01); *E04B 7/14* (2013.01); *E04H 3/14* (2013.01); *E04H 3/22* (2013.01); *F16H 19/04* (2013.01)

(58) Field of Classification Search
CPC ........ E04B 7/166; E04B 1/34357; E04B 7/14; B66D 1/7489; E04H 3/14; E04H 3/22; F16H 19/04
USPC ............................................................ 52/66
See application file for complete search history.

(56) References Cited

U.S. PATENT DOCUMENTS 4,802,314 A   2/1989  Schildge, Jr.

FOREIGN PATENT DOCUMENTS

| AT | 507 675 A4 | 7/2010 |
| DE | 12 72 522 B | 7/1968 |
| DE | 23 16 993 B1 | 6/1974 |
| EP | 3 733 997 A1 | 11/2020 |
| FR | 1 550 412 A | 12/1968 |

OTHER PUBLICATIONS

European Search Report for corresponding European Application No. 19305552.2 dated Dec. 2, 2019.

*Primary Examiner* — Patrick J Maestri
(74) *Attorney, Agent, or Firm* — Pearne & Gordon LLP (57) ABSTRACT

The removable roof system includes a set of guy ropes (10), each of the guy ropes extending between a top anchor point (2) and a bottom anchor point (3) of a structure to be covered, a velum (1) mobile between a deployed configuration in which the velum covers the structure to be covered and a retracted configuration in which the structure to be covered is uncovered, and a set of carriages (20) to which the velum is attached, arranged so as to be moved along the guy ropes of the set of guy ropes between the top and bottom anchor points in order to cause the velum to pass between its deployed and retracted configurations and comprising for each of the guy ropes of the set of guy ropes at least one motorized carriage, at least one motorized carriage cooperating with the associated guy rope by meshing or by alternating wedging.

16 Claims, 7 Drawing Sheets

REMOVABLE ROOF DEVICE

TECHNICAL FIELD OF THE INVENTION

The invention concerns a removable roof system of the type including a set of guy ropes, a set of carriages moving along the guy ropes and a flexible velum connected to the set of carriages.

PRIOR ART

It has long been known to use a flexible velum to cover at will all or part of a building having a portion open to the sky. One such building is for example an outdoor swimming pool or a stadium or an arena or an amphitheater open to the sky. The devices used to this end generally include ropes or cables tensioned above the surface of the building to be covered and on which travel carriages driving in a deployment or retraction movement the flexible velum suspended from these carriages. One such device is described in the document FR 1 550 412.

To facilitate the deployment or the retraction of the flexible velum, the device described in the above document includes a set of self-propelled carriages that include an arrangement of three grooved pulleys, a lower pulley and two upper pulleys, gripping the cable along which the self-propelled carriage concerned travels so that the cable forms a loop around the lower pulley, which is therefore motorized. This friction method of driving a cable in a pulley groove does not enable high traction forces to be obtained. Although this is sufficient for moving a velum of a few hundred square meters covering a building such as the pool of a municipal swimming pool, it becomes insufficient for moving a velum of several thousand square meters intended to cover a stadium, such as an Olympic stadium for example.

STATEMENT OF THE INVENTION

One object of the invention is to provide a removable roof system that enables a velum of very large size to be moved.

To this end, there is provided, in accordance with the invention, a removable roof system including a set of guy ropes, each of the guy ropes extending between a top anchor point and a bottom anchor point of a structure to be covered, a velum mobile between a deployed configuration in which the velum covers the structure to be covered and a retracted configuration in which the structure to be covered is uncovered, and a set of carriages to which the velum is attached, arranged so as to be moved along the guy ropes of the set of guy ropes between the top and bottom anchor points in order to cause the velum to pass between its deployed and retracted configurations and including for each of the guy ropes of the set of guy ropes at least one motorized carriage cooperating with the associated guy rope by meshing or by alternating wedging.

The removable roof system according to the invention advantageously, but optionally, has at least one of the following technical features:
  the guy rope includes feeders for powering at least one associated motorized carriage;
  the guy rope includes a support cable;
  the velum is attached to a carriage of the set of carriages by connecting means;
  the connecting means include a suspension cable and a tension winch;
  the connecting means include a damper system;
  the connecting means include an anti-oscillation system;
  the connecting means include a bowl fixed to the velum;
  at least one carriage of the set of carriages cooperates with the associated guy rope by meshing;
  the guy rope includes a rack travelling along the guy rope, the associated motorized carriage including a toothed drive wheel adapted to cooperate with the rack to move the motorized carriage along the associated guy rope;
  the guy rope includes means forming circulation paths for the carriages that are associated with it;
  the carriage includes rollers adapted to cooperate with the circulation path forming means;
  at least one carriage of the set of carriages cooperates with the associated guy rope by alternating wedging;
  at least one carriage includes upstream first jaws and downstream second jaws mounted to be mobile in translation on the carriage in a direction of movement of the carriage on the associated guy rope, the first and second jaws being adapted, during movement of the carriage on the associated guy rope, to clamp alternately by wedging a portion of the associated guy rope;
  the jaws have a wedge shape; and
  the first and second jaws are driven via a helicoidal connection.

BRIEF DESCRIPTION OF THE FIGURES

Other features and advantages of the invention will emerge on reading the following description of one embodiment of the invention. In the appended drawings.

For greater clarity, identical or similar elements are identified by identical reference signs in all the figures.

DETAILED DESCRIPTION OF ONE EMBODIMENT

Figure 1:
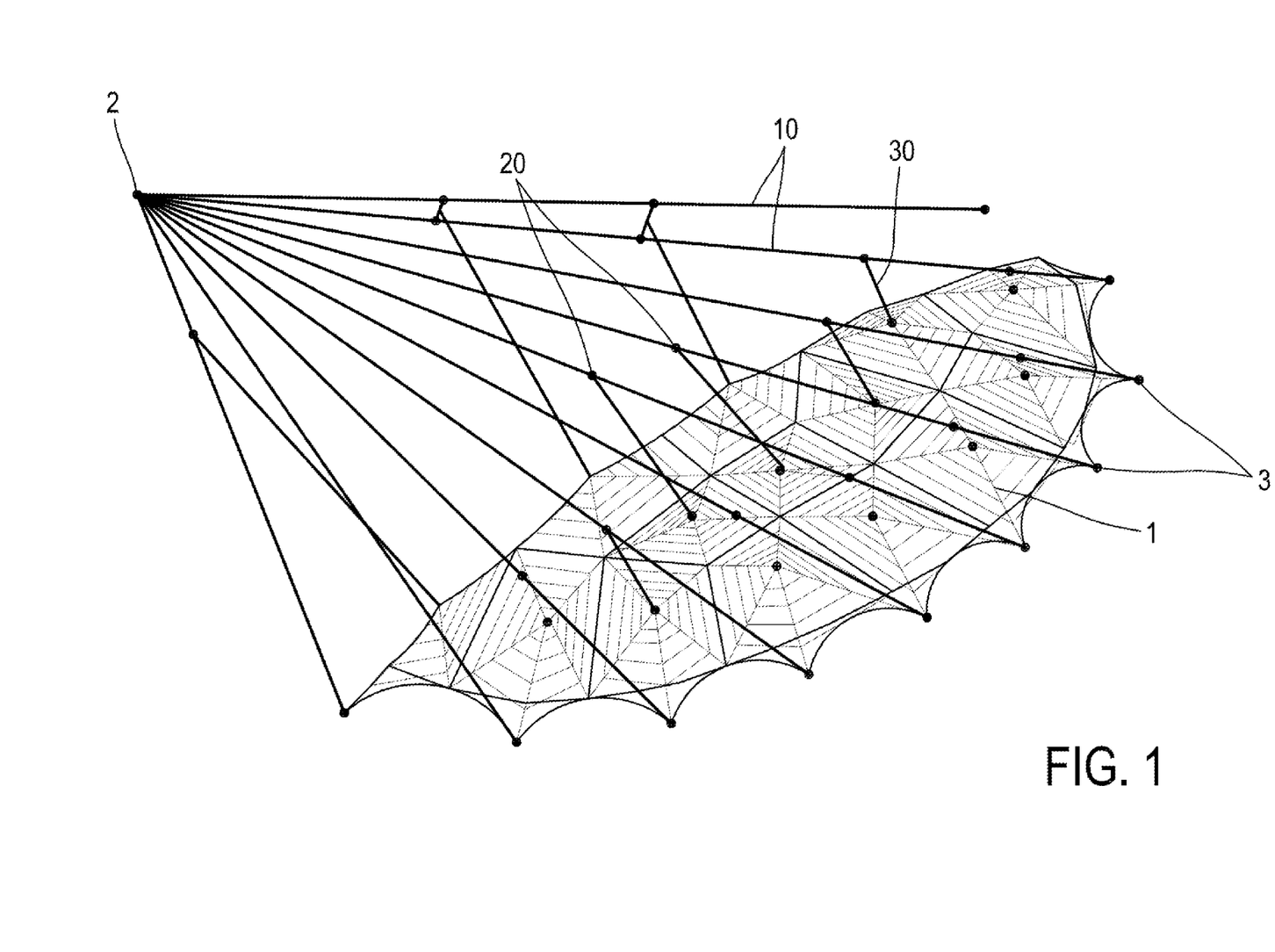
FIG. 1 is a diagrammatic three dimensional view of a removable roof system in accordance with the invention.

A removable roof system in accordance with the invention will be generally described with reference to FIG. 1. The removable roof system in accordance with the invention includes a set of guy ropes 10. Each of the guy ropes 10 extends between a so-called top anchor point 2 and a so-called bottom anchor point 3. Here the top anchor point 2 is common to all the guy ropes 10 of the set of guy ropes and overlies the structure to be covered (not represented).

For example, the top anchor point 2 is situated at the level of the top of a mast or a pylon. The bottom anchor point 3 is positioned at a periphery of the structure to be covered: there are therefore at least as many guy ropes 10 constituting the set of guy ropes as bottom anchor points 3. The set of bottom anchor points 3 is evenly distributed over the periphery of the structure to be covered. Also, the removable roof system in accordance with the invention includes a velum 1 mobile between a deployed configuration in which the velum covers the structure to be covered and a retracted configuration in which the structure to be covered is uncovered. The velum 1 is suspended from the set of guy ropes 10 via a set of carriages 20 that are mounted to be mobile along the guy ropes 10 so as to be able to be moved along the guy ropes 10 between the top anchor points 2 and a positioning point on the guy rope 10 concerned facing the velum 1 situated between the top points 2 and the bottom points 3 of the guy rope 10 concerned. Connecting means 30 are provided between the velum 1 and the carriages 20. Movement of the carriages 20 along the guy ropes 10 will therefore allow the velum 1 to pass from its deployed configuration to its retracted configuration and vice versa. It is to be noted that in FIG. 1 the velum 1 is represented in a partial manner and in its deployed configuration.

The removable roof system in accordance with the invention includes for each of the guy ropes 10 of the set of guy ropes at least one motorized carriage 20. A first embodiment of this motorized carriage 20 will now be described with reference to FIGS. 2 to 5. It is associated with a first embodiment of the removable roof system in accordance with the invention.

In this embodiment of the removable roof system in accordance with the invention the guy rope 10 includes a core 12 which here is a flat cable of rectangular section extending between the top anchor point 2 and the bottom anchor points 3. On the edges of the core 12 the guy rope 20 includes a rim 16 extending on either side of the core 12. On an upper face of the core 12 the guy rope 10 includes circulation path forming means 13, here two in number, separated by a rack 11 in a central position on the upper face of the core 12. At the level of a lower face of the core 12 the guy rope 10 includes feeders 15 for powering the motorized carriages 20 that are intended to move along the guy rope 10. These feeders 15 are for example conductive cables retained and protected by protection means 14 fixed in a central position and routed along the lower face of the core 12. On either side of the protection means 14 the guy rope 10 includes second circulation path forming means, here formed directly on the lower face of the core 12. At least the core 12 is made from a composite material by pultrusion, for example. The rack 11 and the circulation path forming means 13 and the rims 16 are made of composite material.

Figure 5:
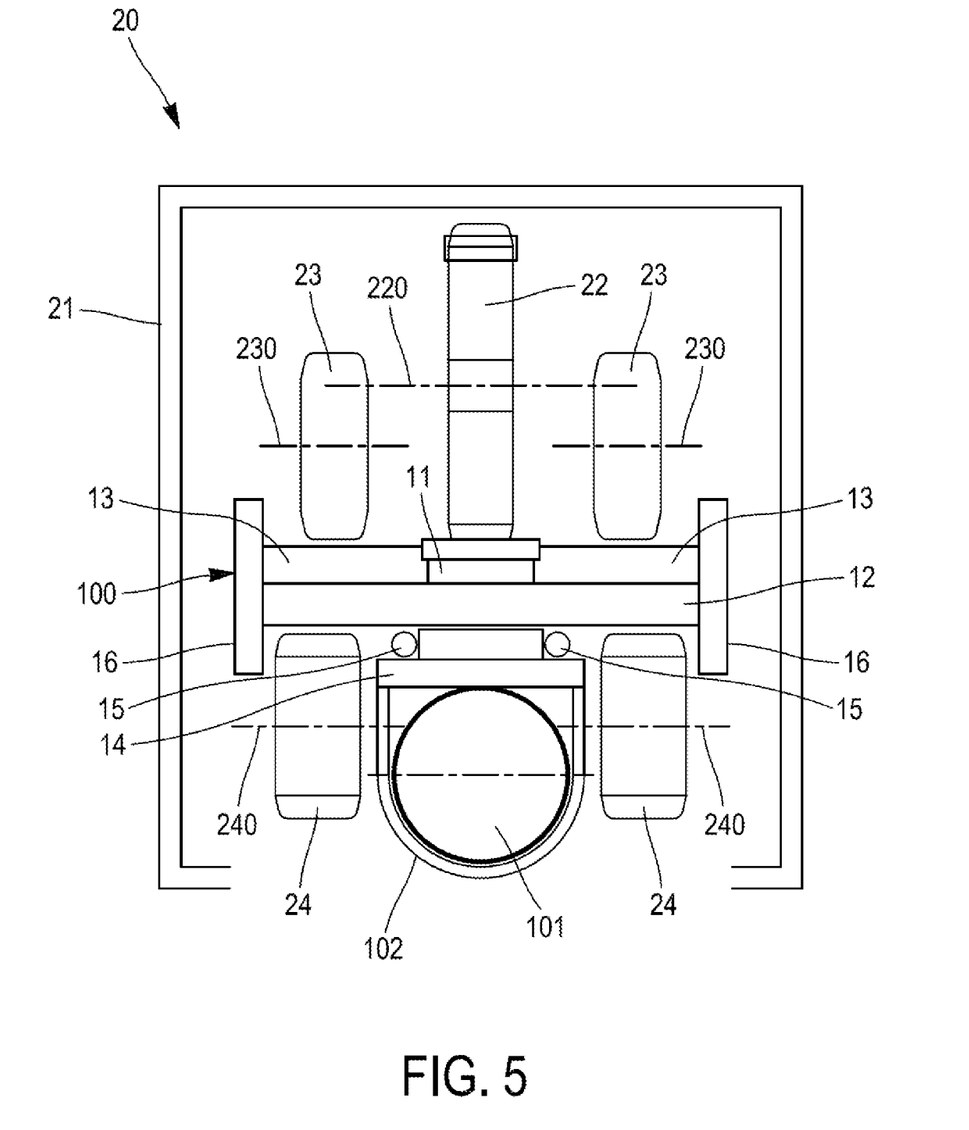
FIG. 5 is a diagrammatic front view illustrating the cooperation of the carriage from FIG. 2 with a variant embodiment of the guy rope from FIG. 4.

In a variant embodiment illustrated in FIG. 5 the guy rope 10 further includes a support cable 101 fixed by means of hoops 102, here to the protection means 14. Thus the support cable 101 supports all the other elements of the guy rope 10.

Figure 2:
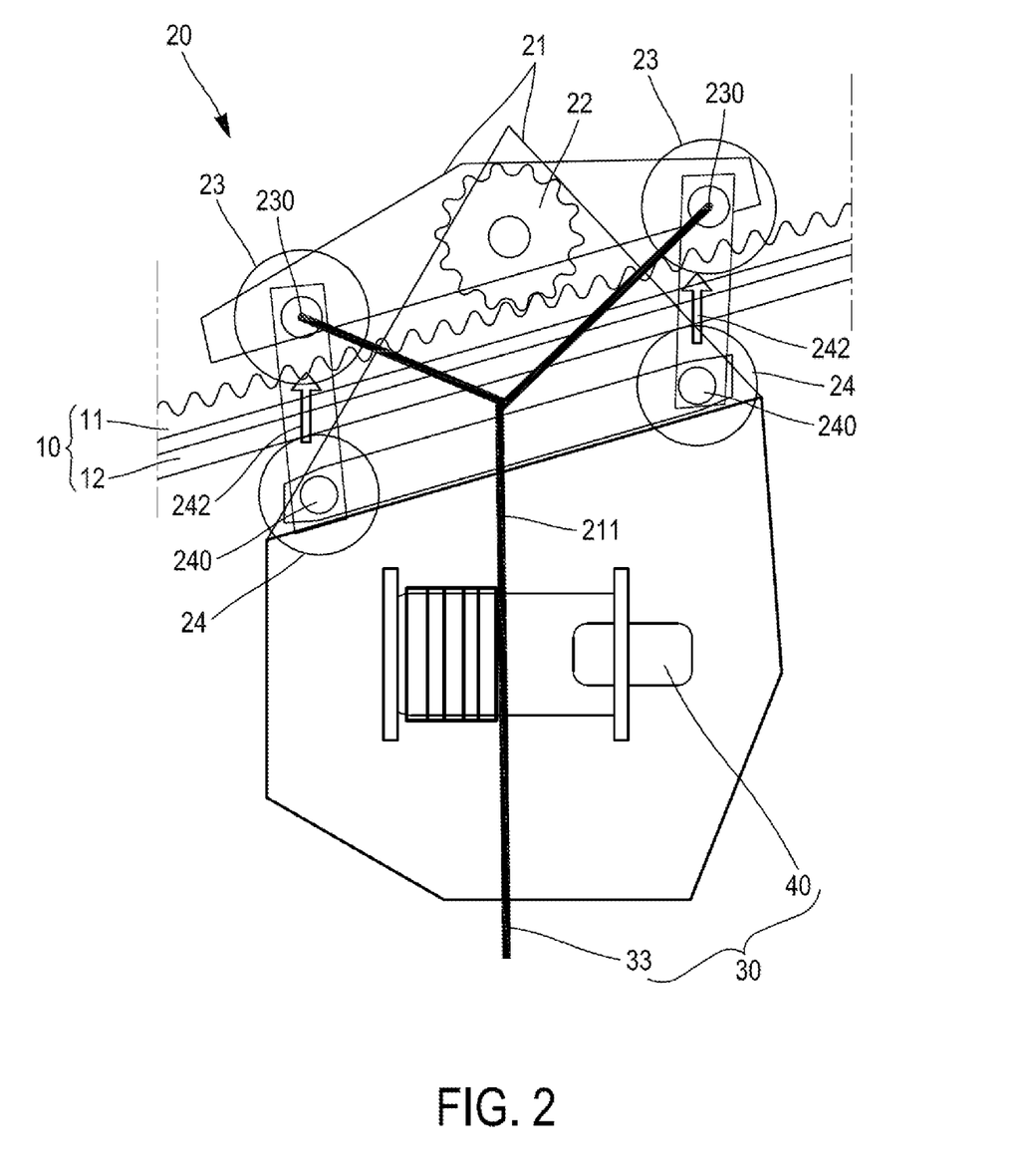
FIG. 2 is a diagrammatic side view of a first embodiment of a self-propelled carriage for the removable roof system in accordance with the invention.

Moving along the guy rope 10 that has just been described, the motorized carriage 20 includes a casing on which is mounted a drive motor 221. The drive motor 221 drives a motor shaft 220 in rotation via transmission means 222. The transmission means 222 include for example a chain or a transmission belt. Mounted on and rigidly attached to the motor shaft 220 is a toothed drive wheel 22. This toothed drive wheel 22 is intended to cooperate with the rack 13 of the associated guy rope 10 during use of the motorized carriage 20.

Figure 3:
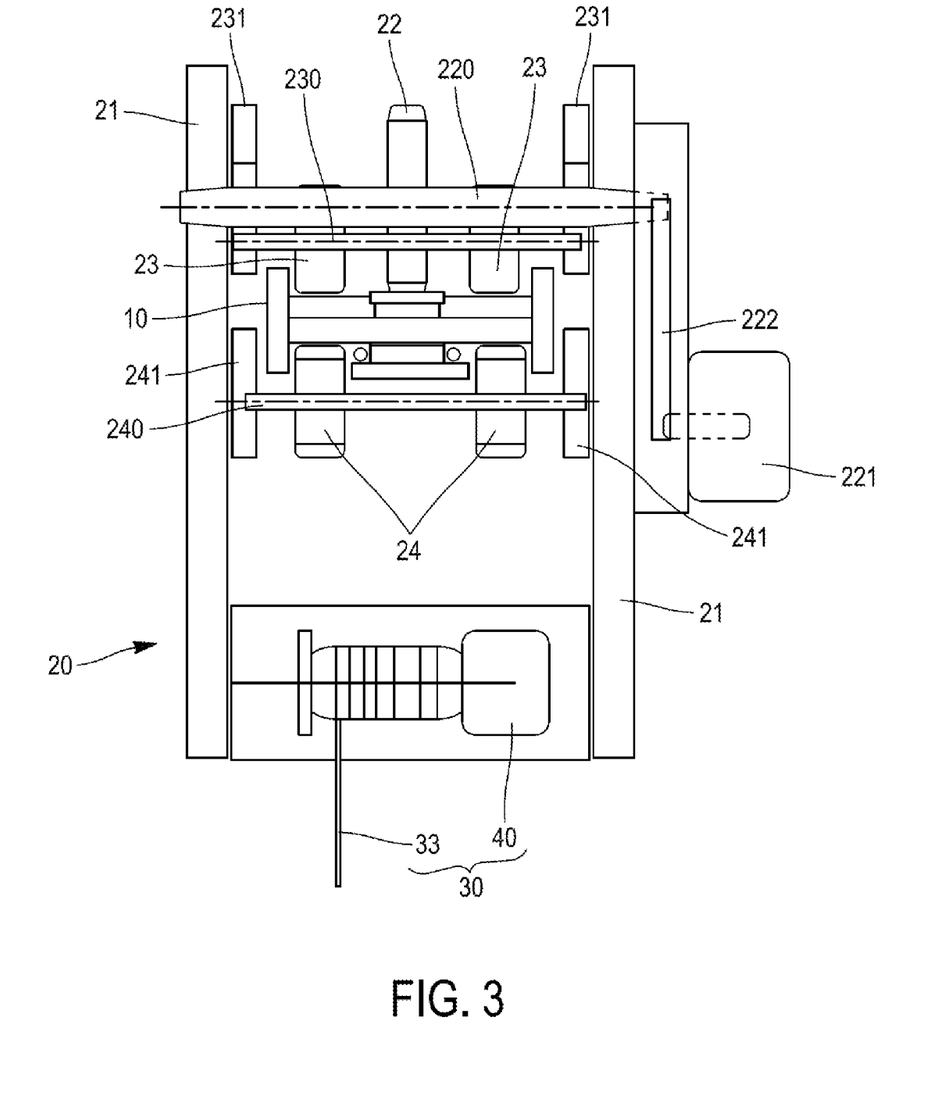
FIG. 3 is a diagrammatic front view of the carriage from FIG. 2.
Figure 4:
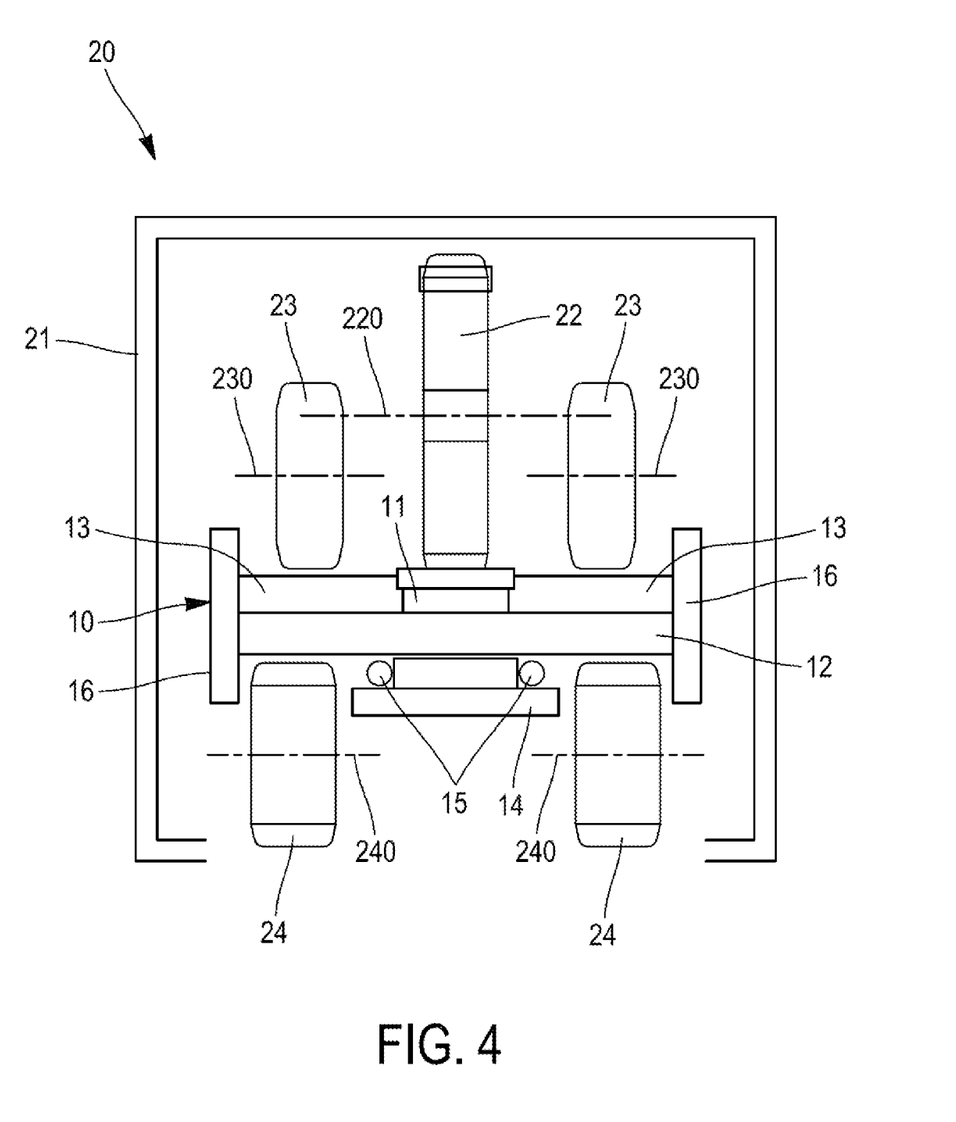
FIG. 4 is a diagrammatic front view illustrating the cooperation of the carriage from FIG. 2 with a guy rope of the roof system in accordance with the invention.
Figure 6:
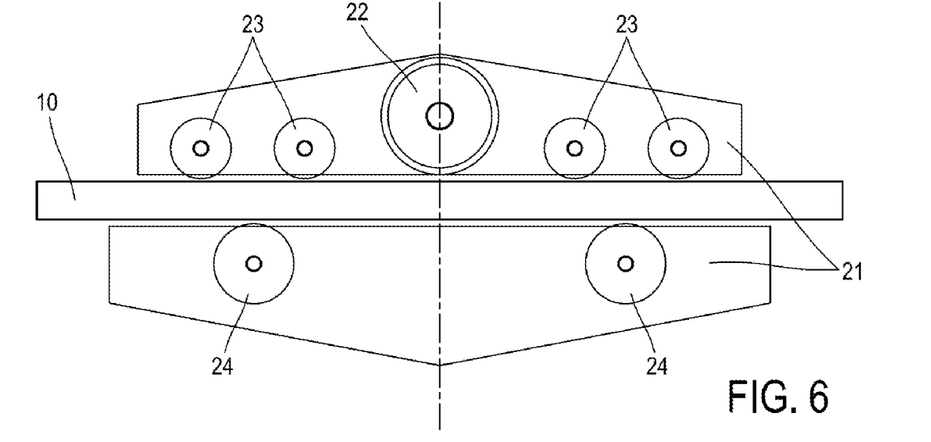
FIG. 6 is a diagrammatic partial side view of a variant embodiment of the carriage from FIG. 2.

On the other hand, the motorized carriage 20 includes first rollers 23 mounted on axles 230 fixed to the casing 21 via bearings 231. The first rollers 23 are intended, during use of the motorized carriage 20, to cooperate with the first circulation path forming means 13 of the associated guy rope 10. Here the first rollers 23 are associated in pairs with the same axle 230 and, as shown in FIGS. 3, 4 and 5, positioned on either side of the toothed drive wheel 22. In a configuration illustrated in FIG. 2 the motorized carriage 20 includes two pairs of first rollers 23: one pair upstream of the toothed drive wheel 22 and one pair downstream of the toothed drive wheel 22. In a variant illustrated in FIG. 6 the motorized carriage 20 includes four pairs of first rollers 23: two pairs upstream and two pairs downstream of the toothed drive wheel 22. The principal function of the first rollers 23 is to support all of the weight of the carriage 20 and to withstand the forces transmitted by the connecting means 30 of the velum 1.

The motorized carriage 20 further includes second rollers 24 mounted on axles 240 fixed to the casing 21 via bearings 241. The second rollers 24 are intended, during use of the motorized carriage 20, to cooperate with the second circulation path forming means situated on the lower face of the core 12 of the associated guy rope 10. Here the second rollers 24 are associated in pairs with the same axle 240 and, as shown in FIGS. 3, 4 and 5, are positioned on either side of the toothed drive wheel 22. The motorized carriage 20 includes two pairs of second rollers 24: one pair upstream of the toothed drive wheel 22 and one pair downstream of the toothed drive wheel 22, each of the pairs of second rollers 254 being substantially in line with the pairs of first rollers 23. In order to ensure that the second rollers 24 bear on the second circulation path forming means the motorized carriage 20 includes contact means 242 schematically represented in FIG. 2 by an arrow. For example, these contact means may be one or more contact springs or one or more contact cylinders. The use of cylinders is preferred because it is then possible to provide emergency braking for the motorized carriage 20. These contact means 242 are for example disposed between the axle 240 of the rollers and the casing 21. The second rollers 24 are support rollers enabling the movement of the carriage 20 on the associated guy rope 10 to be made safe, for example by preventing derailing.

We are now going to describe in more detail the connecting means 30 between the carriage 20 and the velum 1 of the removable roof system in accordance with the invention.

At the level of the carriage 20 the connecting means comprise a tension winch 40 winding/unwinding a suspension cable 33 as a function of requirements. The tension winch 40 is accommodated in the casing 21 of the carriage 20. In order to transmit forces directly to the first rollers 23 the tension winch 40 is fixed to the axles 230 of the first rollers 23 by means of a system of bars or links 211. In a variant embodiment the tension winch 40 is fixed to the casing 21 of the carriage 20. This tension winch 40 is going to make it possible to adjust the intrinsic tension of the velum 1 in the deployed configuration.

At the level of the velum 1 the connecting means 30 with hats include a bowl 4 fixed to the velum 1. This bowl 4 is rigid and serves as a point for anchoring the velum to the connection with the carriage 20: there are therefore as many bowls 4 distributed over the whole of the velum 1 as carriages 20 moving on the set of guy ropes 10 of the removable roof system in accordance with the invention. In a first variant, a free end 32 of the suspension cable 33 is fixed directly to the bowl 4. In a second variant the connecting means 30 include a damper and/or anti-oscillation system 31 that is disposed between the free end 32 of the suspension cable 33 and the bowl 4. The damper and/or anti-oscillation system 33 enables attenuation of the risks of flapping of the velum 1 once in the deployed configuration. In fact, because of the effect of gusts of wind, the bowl 4 situated in a central zone of the deployed velum 1 can be subject to upward and downward movements at greater or lesser speed with amplitudes that can reach two meters.

In accordance with one variant the connecting means include a second winch 41 for adjustment of the tension that is situated on and fixed in the bowl 4. This second winch 41 for adjusting the tension complements the tension winch 40 described above or replaces the latter. In the latter case, the suspension cable 33 is fixed directly to the casing 21 or to the system of links 211.

Figure 7:
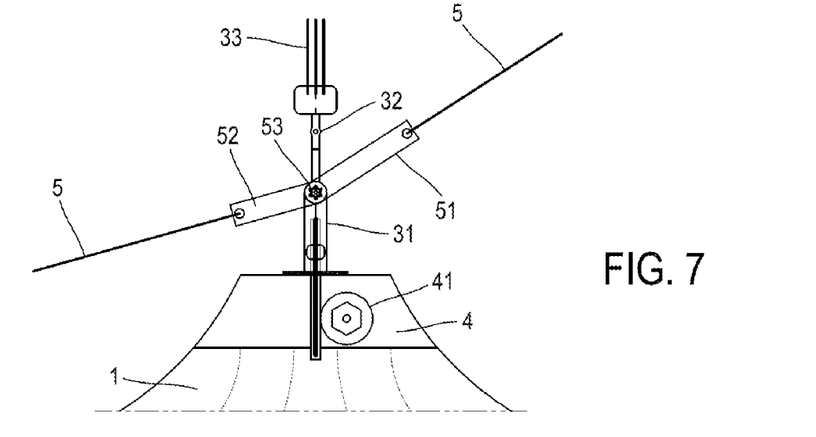
FIG. 7 is a diagrammatic side view of a portion of the means for connecting the velum with a carriage.

Referring to FIG. 7, the removable roof system in accordance with the invention includes a device for reinforcing the support of the velum in the event of high loads on the latter in the deployed configuration. These high loads may be caused, in winter, by the accumulation of snow on the taut velum 1 in the deployed configuration. To this end the reinforcing device includes a set of secondary support cables 5 fixed by means of links 51, 52 to the bowl 4 of the velum 1. The links 51, 52 are articulated to one another at 53 and here are positioned on the damper and/or anti-oscillation system 33. The secondary support cables 5 are connected via the links 51, 52 so as to extend parallel to the guy ropes 10 between the top anchor point 2 and bottom anchor points 3. In practice, the secondary support cables 5 are installed as a function of the weather conditions expected around the structure to be covered equipped with the removable roof system in accordance with the invention, in particular before winter, and the secondary cables remain in place up to the first retraction of the velum 1 following said winter season. These secondary cables are loaded only in the event of a normal capacity of the suspension cables 30 (with the torque limiter device) being exceeded, because of a snow load, for example.

Figure 8:
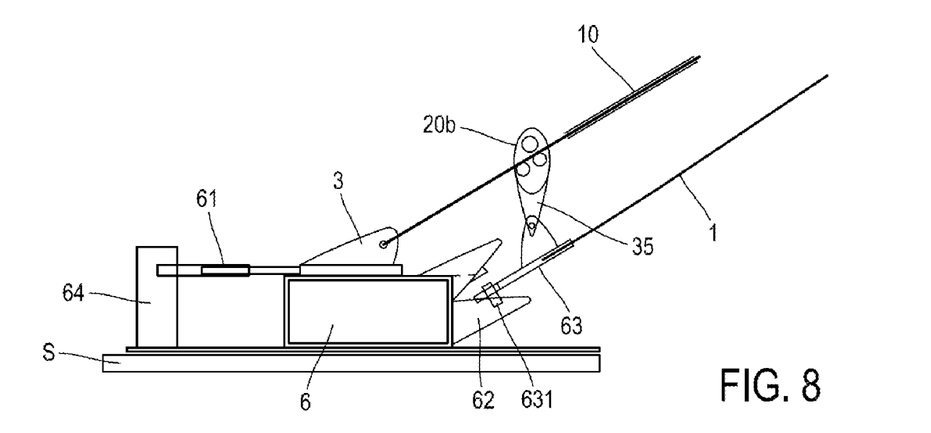
FIG. 8 is a diagrammatic side view of a bottom anchor point for the removable roof system in accordance with the invention.

We will now describe in more detail with reference to FIG. 8 the structure S to be covered by the removable roof system in accordance with the invention at the level of a bottom anchor point 3. At the level of the periphery of the structure S the latter includes a box section 6 that is continuous around the periphery of the structure S. The box section 6 is fixedly mounted on an upper surface of the periphery of the structure S. For example, a fixing of the box section 6 to the upper surface of the periphery of the structure S includes special elastic and/or visco-elastic type anchors enabling uptake of forces applied by the velum 1 in the deployed position whilst ensuring freedom of expansion movements whilst respecting the existing structure S. The box section 6 supports the bottom anchor point 3, mobile in translation. The bottom anchor point 3 is connected to a tensioning device including a fixed abutment 64 and a driving means 61 (such as a cylinder) for varying the tension in the guy rope 10 concerned, according to the various configurations of the removable roof system in accordance with the invention. A removable fixing means of the velum 21 is rigidly attached to the box section 6. By way of an end carriage 20*b*, a velum support 63 associated with the velum 1 is introduced into and guided in the removable fixing means 62 and a key 631 (such as a piston key) locks a connection between the removable fixing means 62 and the velum support 63, the velum 1 then being in the deployed position. The velum 1 can then be tensioned. A converse scenario is employed for retracting the velum 1: after releasing the tensions at the level of the various bowls 4, the keys 66 are disengaged from their associated velum support 63, which is then driven upward away from the bottom anchor point 3 by the associated end carriage 20*b*.

Figure 9:
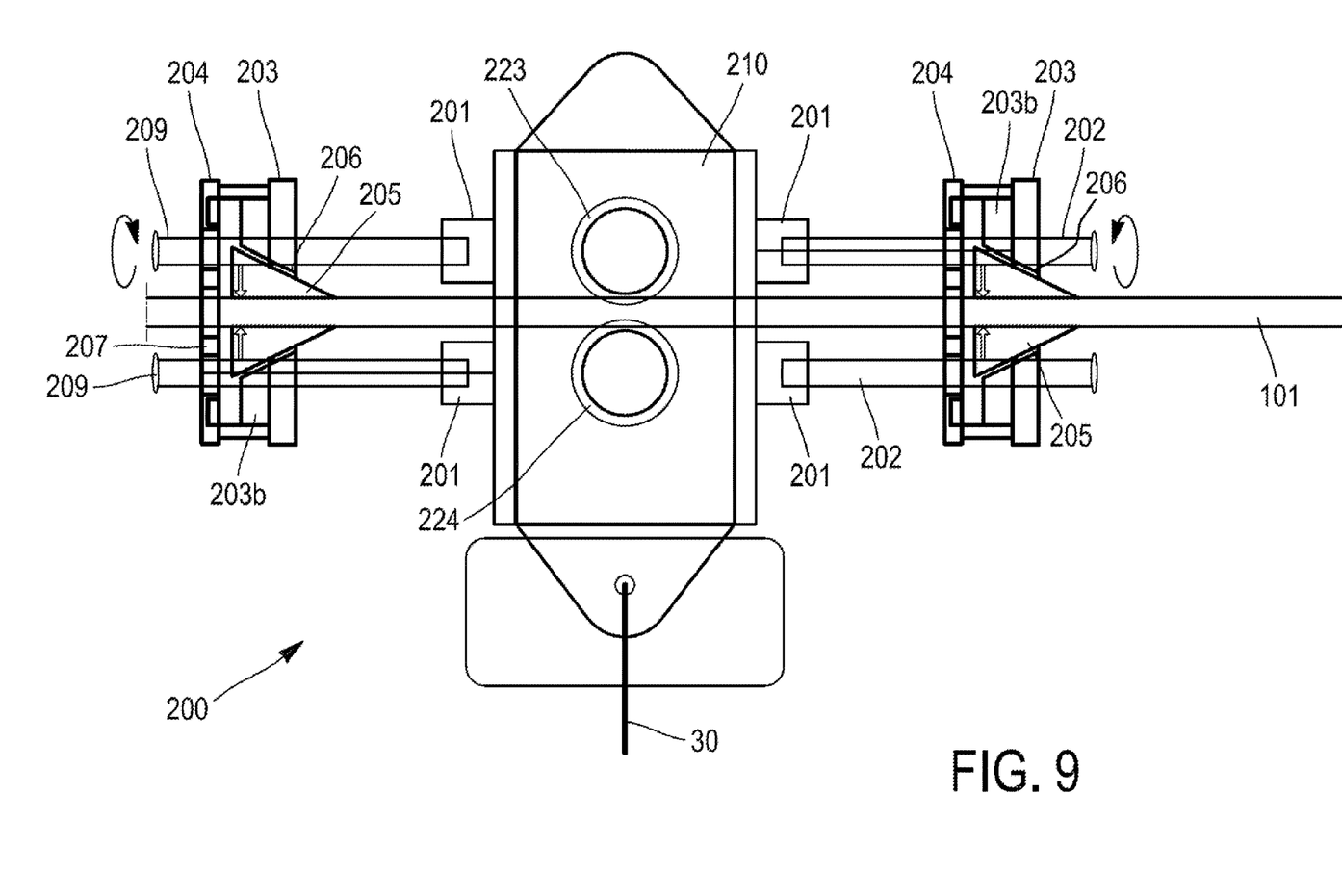
FIG. 9 is a diagrammatic side view of a second embodiment of a self-propelled carriage for the roof system in accordance with the invention.

We are going to describe with reference to FIG. 9 a second embodiment of a removable roof system in accordance with the invention, in particular a motorized carriage 200 of the set of carriages of the removable roof system in accordance with the invention.

In this second embodiment the removable roof system in accordance with the invention includes a set of guy ropes 101 that here are circular section support cables known in themselves. The carriage 200 includes a casing 210 in which a first roller grooved 223 (or string of grooved rollers) is mounted to be freely rotatable and comes to bear and roll on the support cable 101 of the associated guy rope. In line with the first roller 223 the carriage 200 includes a second grooved roller 224 mounted to rotate freely in the casing 210. This second roller 224 is a support and guide roller that comes to bear on and roll on the underside of the support cable 101 of the associated guy rope. The function of the second roller 224 is similar to that of the second rollers 24 described above for the first embodiment of the removable roof system in accordance with the invention. As before the connecting means 30 with the velum 1 are fixed to the casing 210. The connecting means 30 for the second embodiment of the removable roof system in accordance with the invention are similar to what had been described above.

Also, the carriage 200 includes driving means by alternating wedging that enable the carriage 200 motorized in this way to be moved along the support cable 101 forming the associated guy rope. These driving means by alternating wedging include two similar drive blocks. The first, upstream block is positioned on the side of the carriage that is oriented toward the top anchor point of the associated guy rope (to the right of the casing 210 in FIG. 9) and the second, downstream block is positioned on the side of the carriage that is oriented toward the bottom anchor point 3 of the associated guy rope (to the left of the casing 210 in FIG. 9).

Each of the upstream and downstream blocks includes at least one motor 201 that is fixed to the casing 210 of the carriage 200. The output of the motor 201 drives in rotation a threaded rod 202 that serves as a lead screw. Here, as illustrated in FIG. 9, the upstream or downstream block includes two motors 201 each driving a threaded rod 202 and situated on either side of the associated guy rope. Each of the upstream and downstream blocks further includes a plate 203 possibly associated with a counter-plate 203*b*. The plate 203, and where applicable the counter-plate 203*b*, include(s) a threaded through-hole into/from which the threaded rod 202 is screwed/unscrewed. The plate 203, and where applicable the counter-plate 203*b*, include(s) as many threaded through-holes as drive motors 201/threaded rods 202, here two in number in FIG. 9. Also, the plate 203, and where applicable the counter-plate 203*b*, include(s) a through-hole 206 of frustoconical shape through which passes the support cable 101 forming the guy rope associated with the carriage 200. The orientation of the frustoconical shape of the through-hole 206 is such that a smaller base of the frustoconical shape is on the upstream side (to the right in FIG. 9) and a larger base of the frustoconical shape is on the downstream side (to the left in FIG. 9). The upstream or downstream block further includes a cap plate 204 that is fixed and positioned parallel to the plate 203 and therefore extends at a distance from and facing the plate 203. The cap plate 204 includes through-holes for the free passage of the support cable 101 forming the guy rope associated with the carriage 200 and the threaded rod or rods 202. Where applicable the counter-plate 203b is positioned between the plate 203 and the cap plate 204. The assembly formed by the plates 203 and cap plates 204 therefore delimits a cage in which is trapped a series of frustoconical wedge-keys 205 oriented so as to be able to come to be inserted into the through-hole 206. The frustoconical shape of the assembly of wedge-keys 205 is complementary to the frustoconical shape of the through-hole 206: thus, once the carriage 200 has been placed on the associated guy rope, the wedge-keys 205 are able to slide on the support cable 101 between a position in which they bear on the cap plate 204, releasing the support cable 101, and a position in which they come to bear on a frustoconical surface of the through-hole 206, therefore gripping the support cable 101 by wedging.

The difference in configuration between the upstream and downstream blocks lies in the orientation of the cage. In the upstream block the cap plate 204 faces the casing 210 of the carriage 200. In the downstream block it is the plate 203 that is on the side of the casing 210.

In operation the movement of the carriage 200 on the smooth rope is effected in the manner of a mountain climber, by alternating wedging between the two upstream and downstream blocks. We are going briefly to describe a sequence of movement of the carriage 200 on the associated guy rope. Initially the cage of the downstream block is closer to the casing 210. The motors 201 of the downstream block are used to move the cage away from the downstream block of the casing 201 until it is positioned at the end of the threaded rods 202. The wedge-keys 204 are then completely inserted in the through-hole 206 and therefore grip the support cable 101 by wedging. Consequently the cage of the downstream block is then immobilized on the support cable 101 and the casing 210 slides along the support cable away from the cage of the downstream block. At the same time, during this movement of the casing 210 of the carriage 200, the wedge-keys 204 of the upstream block are disengaged from the through-hole 206 of the upstream block and come to bear on the cap plate 204 of the upstream block, which moves them along the support cable 101 that they are no longer gripping. The motors 201 of the upstream block are used to move the cage away from the upstream block of the casing 210 until it is positioned at the end of the threaded rods 202.

Then, in a second period, once the cages of the upstream and downstream blocks are at the end of the respective threaded rods 202, the operation of the motors 201 of the upstream block is reversed so as to move the cage of the upstream block toward the casing 210 until it is positioned closest to said casing 210. The wedge-keys 204 of the upstream block are then completely inserted in the through-hole 206 of the upstream block and therefore grip the support cable 101 by wedging. Consequently the cage of the upstream block is then immobilized on the support cable 101 and the casing 210 slides along the support cable toward the cage of the upstream block. At the same time, during this movement of the casing 210 of the carriage 200, the wedge-keys 204 of the downstream block are disengaged from the through-hole 206 of the downstream block and come to bear on the cap plate 204 of the downstream block, which moves them along the support cable 101 that they are no longer gripping. The motors 201 of the downstream block are used to move the cage of the downstream block toward the casing 210 until it is positioned closest to the casing 210 of the carriage 200. The cycle then recommences.

With a removable roof system in accordance with the invention that has just been described it is possible to cover an Olympic stadium such as that in Montreal, Canada with a velum 1 of the order of 20,000 m$^2$ and a set of seventeen guy ropes 10 or 101 associated with a set of twenty-five to twenty-seven carriages 20, 200 connected to as many bowls 4 provided on the velum 1 and a set of seventeen end carriages 20b. Starting up the motorized carriages can be controlled manually and/or automatically: manual control in the case of exceptional situations and automatic control in the case of normal operation.

Moreover, the removable roof system in accordance with the invention can also include a caulking device at the periphery of the velum 1 in the deployed position that comprises more flexible fabric portions that do not contribute to the principal strength of the velum 1 but ensure closure of the volume of the structure thus covered and therefore a seal in winter periods for example. These skirts positioned in line with the velum 1 are fixed on the one hand all along an edge of the velum 1 between two successive velum support 63 and come to close up along the peripheral metal box section by means of a zipper type system activated by dedicated small electric carriages.

It is of course possible to make numerous modifications to the invention without departing from the scope thereof.

The invention claimed is:

1. A removable roof system including a set of guy ropes, each of the guy ropes extending between a top anchor point and a bottom anchor point of a structure (S) to be covered, a velum mobile between a deployed configuration in which the velum covers the structure to be covered and a retracted configuration, in which the structure to be covered is uncovered, and a set of carriages to which the velum is attached, arranged so as to be moved along the guy ropes of the set of guy ropes between the top and bottom anchor points in order to cause the velum to pass between its deployed and retracted configurations and comprising for each of the guy ropes of the set of guy ropes at least one motorized carriage, wherein at least one motorized carriage cooperates with the associated guy rope by meshing or by alternating wedging.

2. The removable roof system according to claim 1, wherein the guy rope includes feeders for powering at least one associated motorized carriage.

3. The removable roof system according to claim 1, wherein the guy rope includes a support cable.

4. The removable roof system according to claim 1, wherein the velum is attached to a carriage of the set of carriages by a connecting means.

5. The removable roof system according to claim 4, wherein the connecting means include a suspension cable and a tension winch.

6. The removable roof system according to claim 4, wherein the connecting means include a damper system.

7. The removable roof system according to claim 4, wherein the connecting means include an anti-oscillation system.

8. The removable roof system according to claim 4, wherein the connecting means include a bowl fixed to the velum.

9. The removable roof system according to claim 1, wherein at least one carriage of the set of carriages cooperates with the associated guy rope by meshing.

10. The removable roof system according to claim 9, wherein the guy rope includes a rack travelling along the guy rope, the associated motorized carriage including a toothed drive wheel adapted to cooperate with the rack to move the motorized carriage along the associated guy rope.

11. The removable roof system according to claim 10, wherein the guy rope includes means forming circulation paths for the carriages that are associated with it.

12. The removable roof system according to claim 11, wherein the carriage includes rollers adapted to cooperate with the circulation path forming means.

13. The removable roof system according to claim 1, wherein at least one carriage of the set of carriages cooperates with the associated guy rope by alternating wedging.

14. The removable roof system according to claim 13, wherein at least one carriage includes upstream first jaws and downstream second jaws mounted to be mobile in translation on the carriage in a direction of movement of the carriage on the associated guy rope, the first and second jaws being adapted, during movement of the carriage on the associated guy rope, to clamp alternately by wedging a portion of the associated guy rope.

15. The removable roof system according to claim 14, wherein the jaws have a wedge shape.

16. The removable roof system according to claim 14, wherein the first and second jaws are driven via a helicoidal connection.

* * * * *

UNITED STATES PATENT AND TRADEMARK OFFICE
CERTIFICATE OF CORRECTION

PATENT NO. : 11,499,311 B1
APPLICATION NO. : 17/237512
DATED : November 15, 2022
INVENTOR(S) : Roger Taillibert and Robert Debono It is certified that error appears in the above-identified patent and that said Letters Patent is hereby corrected as shown below:

On the Title Page

(57) Abstract:
"The removable roof system includes a set of guy ropes (10), each of the guy ropes extending between a top anchor point (2) and a bottom anchor point (3) of a structure to be covered, a velum (1) mobile between a deployed configuration in which the velum covers the structure to be covered and a retracted configuration in which the structure to be covered is uncovered, and a set of carriages (20) to which the velum is attached, arranged so as to be moved along the guy ropes of the set of guy ropes between the top and bottom anchor points in order to cause the velum to pass between its deployed and retracted configurations and comprising for each of the guy ropes of the set of guy ropes at least one motorized carriage, at least one motorized carriage cooperating with the associated guy rope by meshing or by alternating wedging."

Should be:
--The removable roof system includes a set of guy ropes, each of the guy ropes extending between a top anchor point and a bottom anchor point of a structure to be covered, a velum mobile between a deployed configuration in which the velum covers the structure to be covered and a retracted configuration in which the structure to be covered is uncovered, and a set of carriages to which the velum is attached, arranged so as to be moved along the guy ropes of the set of guy ropes between the top and bottom anchor points in order to cause the velum to pass between its deployed and retracted configurations and including for each of the guy ropes of the set of guy ropes at least one motorized carriage, at least one motorized carriage cooperating with the associated guy rope by meshing or by alternating wedging.--

In the Specification

Column 3; Line 59:
"includes a casing on"
Should be:
--includes a casing 21 on--

Signed and Sealed this
Tenth Day of October, 2023

Katherine Kelly Vidal
*Director of the United States Patent and Trademark Office*

Column 3; Line 65:
"drive wheel is intended"
Should be:
--drive wheel 22 is intended--

Column 5; Line 58:
"fixing means of the velum"
Should be:
--fixing means 62 of the velum--